_(4,657,341)_

United States Patent [19]

Sammueller

[11] Patent Number: 4,657,341
[45] Date of Patent: Apr. 14, 1987

[54] CONNECTOR FOR LIGHT WAVEGUIDES AND METHOD OF PRODUCING SAME

[75] Inventor: Rudolf Sammueller, Munich, Fed. Rep. of Germany

[73] Assignee: Siemens Aktiengesellschaft, Berlin and Munich, Fed. Rep. of Germany

[21] Appl. No.: 634,468

[22] Filed: Jul. 27, 1984

[30] Foreign Application Priority Data

Aug. 3, 1983 [DE] Fed. Rep. of Germany ....... 3328053
Mar. 9, 1984 [DE] Fed. Rep. of Germany ....... 3408783

[51] Int. Cl.⁴ ................................................ G02B 6/36
[52] U.S. Cl. ............................... 350/96.22; 350/96.10; 350/96.20
[58] Field of Search ................. 350/96.20, 96.21, 96.22

[56] References Cited

U.S. PATENT DOCUMENTS 3,871,935 3/1975 Gioge et al. .................. 350/96.21 X
4,062,620 12/1977 Pirolli ............................. 350/96.20
4,088,386 5/1978 Hawk ............................... 350/96.21
4,123,137 10/1978 Marcatilli ...................... 350/96.22 X
4,475,790 10/1984 Little .............................. 350/96.21
4,487,474 12/1984 Nishie et al. ................... 350/96.21

FOREIGN PATENT DOCUMENTS 969744 6/1975 Canada .

Primary Examiner—William L. Sikes
Assistant Examiner—Akm E. Ullah

[57] ABSTRACT

A connector having connector parts comprising a carrier plate having parallelly extending centering grooves for receiving light waveguides held by a cover plate characterized by each of the connector parts being held in alignment with an adjacent part by guide elements having ribs extending into auxiliary grooves formed in the carrier plates. Preferably, each of the individual centering grooves has a dimension to receive a waveguide free of any protective layers or cladding and the grooves opposite the abutting face are provided with enlargements such as a common recess to enable receiving the waveguides with the layer. Preferably, the carrier plates are made of silicon and the grooves for both centering and the guide elements are etched therein.

33 Claims, 4 Drawing Figures

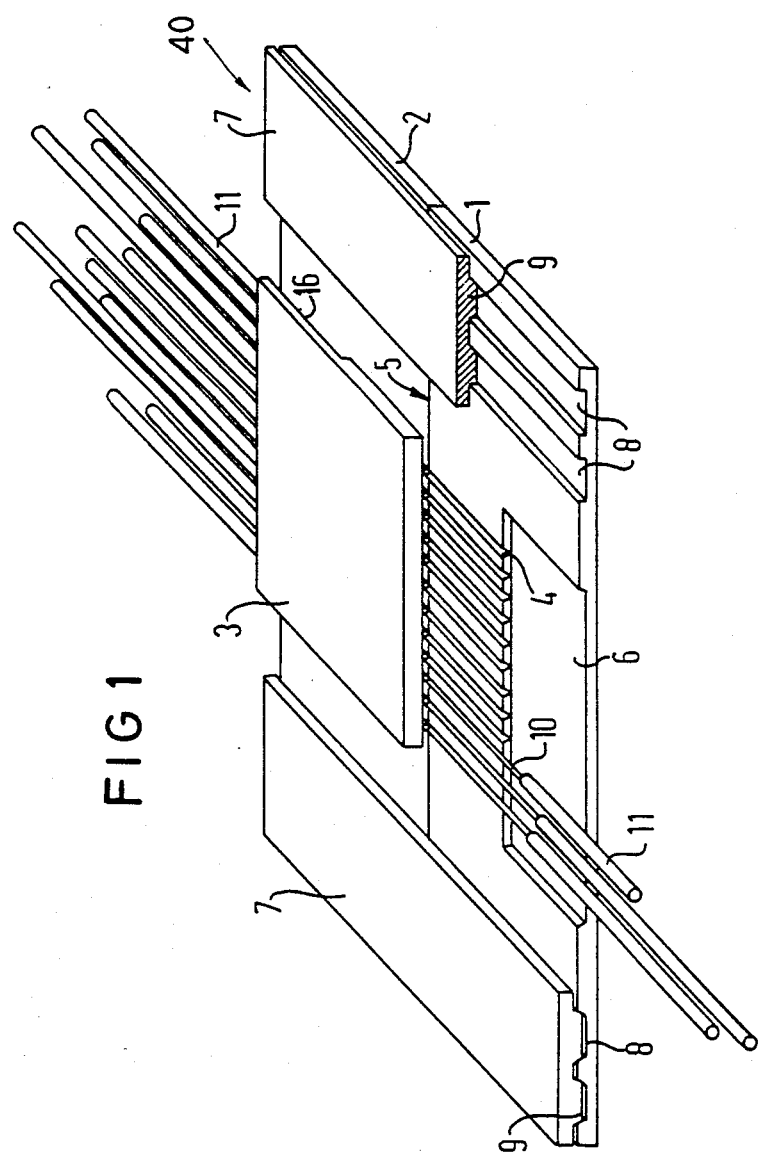

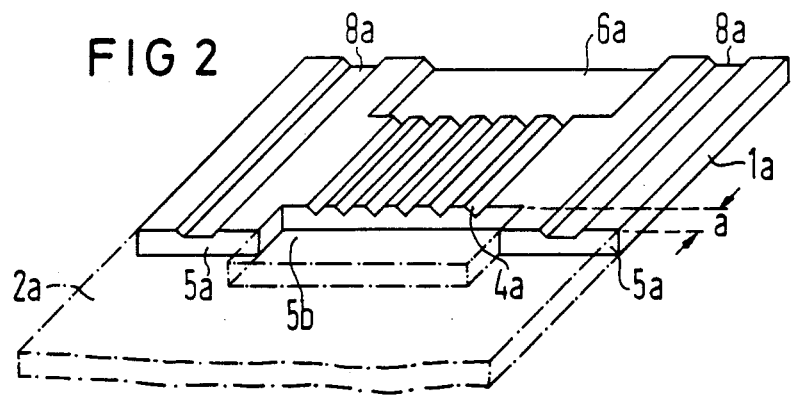
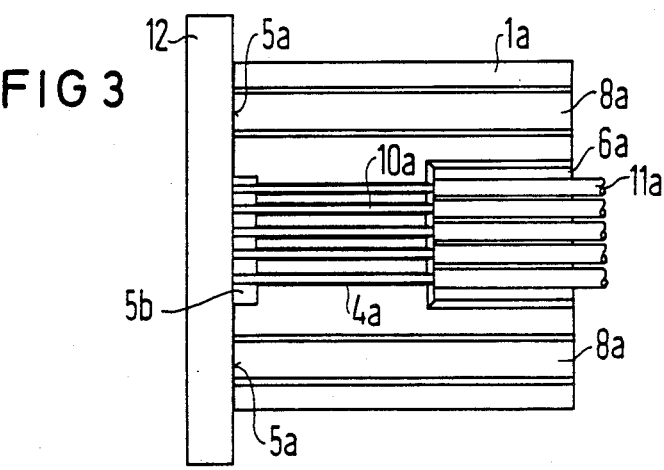
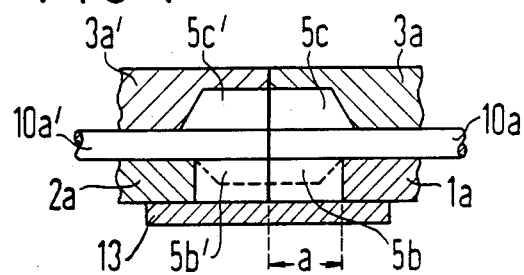

CONNECTOR FOR LIGHT WAVEGUIDES AND METHOD OF PRODUCING SAME

BACKGROUND OF THE INVENTION

The present invention is directed to a connector for light waveguides, said connector having two carrier members with a plurality of V-shaped, parallelly extending centering grooves etched into the carrier members.

A method for connecting light waveguides as well as an apparatus for the implementation of the method is known from German printed application No. 23 45 273 which claims priority from an application that issued as Canadian Patent No. 969,744. In this disclosure, a V-shaped groove was crystallographically etched into a carrier and the two ends of the light waveguides to be joined together were placed in the groove in an abutting relationship. Given such an arrangement, a single carrier piece is utilized and the light waveguides are brought together in the grooves. However, assuming a releasable connector, an opening of the arrangement caused the losing of the centering of the light waveguides and required repeating the assembly operation. Thus, with a releasable connector arrangement, renewed connections again required an additional cost during assembly with all aids that are necesary for centering and fixing the light waveguides in the various grooves.

SUMMARY OF THE INVENTION

The present invention is directed to providing a connector which enables a simple joining of the light waveguide ends without assembly aids whereby both releasable as well as non-releasable connectors can be produced with the same arrangement.

To accomplish this object, the invention is directed to an improvement in a connector for light waveguides having two carrier plates, each plate having means for guiding the waveguides including V-shaped, parallelly extending grooves etched in a surface of the carrier plate. The improvements comprise each plate having an abutting surface extending transverse to the grooves and a joining region being formed adjacent said abutting surface, said grooves in the joining area having a dimension for receiving and positioning the waveguides free of any protective layer and cladding; at least one cover element for covering the grooves with the waveguides therein; at least one guide element extending between the two plates; bridging the abutting surfaces and holding the plates with the grooves of one plate aligned with the grooves of the other plate; and means for holding the carrier plates, the cover plate and the guide element together.

Given connectors for light waveguides according to the invention, it is possible to produce one or even more light waveguide connections at the same time. In this fashion, the connecting system can be employed in a bundle technique, for example, when connecting a plurality of fibers within a lead or even given fiber bundles having individual leads. The connection location can therefore be designed both as a releasable or a nonreleasable connection. Given the connector arrangement according to the invention, the light waveguides are placed in, for example, V-shaped centering grooves as is already known. As a result of the special structural design, however, this embodiment allows very simple assembly which can be executed with the highest precision in either the shop or in the field. Given the embodiment, for example, all splice parts consist of silicon in which the centering grooves, the auxiliary grooves or other recesses are etched. Given the connector element according to the invention, each end of the light waveguide unit to be connected is first rigidly disposed on a special carrier member or a plate. At its side facing the parting location, each carrier member has an abutting surface that extends transverse to the centering grooves which are manufactured with special precision and receive the light waveguides which are provided without their protective layer. Depending upon the need, a corresponding plurality of centering grooves can be provided side-by-side proceeding parallel to one another. The parting location formed by the two abutting surfaces is bridged by a guide element after the two carrier members have been joined. In addition, at least one tightly fitting cover plate is attached. An extremely high precision in the alignment of the individual connecting locations is possible in this fashion due to the precision of the guide elements. In addition, the connector element which has not been joined can be releasably or nonreleasably held together with the assistance of a great variety of holding means.

The centering grooves are expediently expanded at an end opposite the abutting surface in order to be able to accept the light waveguides together with their protective layer or cladding. This expansion is designed either as an expanded centering groove for each individual centering groove or as a common recess for all of the centering grooves together. These recesses are advantageously dimensioned such that the smallest diameter of the light waveguide terminates flush at the upper edge of the centering groove after the light waveguide has been inserted.

Auxiliary grooves proceeding parallel to the centering grooves are also expediently etched into the carrier member or plate. The guide elements have correspondingly matching profiles which are capable of insertion into these auxiliary grooves. The profile and the grooves are precisely matched to provide the necessary guidance.

The invention also relates to a method for producing the connector element wherein the light waveguides are introduced into and fixed in a centering groove with the assistance of an assembly facility encompassing the individual assembly steps. The ends of the light waveguides are first introduced into bores of a stripping tool so that the protective layer or cladding can be pulled off. Then the waveguides free of the cladding or protective layer are positioned in holding means such as combs and the carrier member is then introduced between the spaced combs with the waveguides being lowered into the centering grooves and the recess of the carrier plate. Subsequently, a cover plate can be added and secured if desired.

BRIEF DESCRIPTION OF THE DRAWINGS

FIG. 1 is a perspective view of a first embodiment of the inventive connector with portions in cross-section for purposes of illustration;

FIG. 2 is a perspective view of a modified embodiment of the connector in accordance with the present invention;

FIG. 3 is a plan view of the embodiment of FIG. 2; and

FIG. 4 is a cross-sectional view of a connection using the embodiments of FIGS. 2 and 3.

DESCRIPTION OF THE PREFERRED EMBODIMENTS

The principles of the present invention are particularly useful in a connector generally indicated at 40 in FIG. 1. The connector 40 is illustrated as being partially assembled and has portions broken away for purposes of illustration. As illustrated, the connector 40 comprises a pair of carrier members or plates 1 and 2 with the carrier plate 1 being free of a cover element to facilitate the illustration of the plate. In addition, the holding means for holding the various parts are not illustrated since various arrangements can be utilized as the holding means.

The two identical carrier plates 1 and 2 have abutting or abutment surfaces which lie against one another to form a common parting location 5. Each of the carrier plates 1 and 2 advantageously consist of an etchable material such as, for example, silicon, so that a plurality of centering grooves 4 can be etched into the surface of the plate by a suitable etching method. The centering grooves 4, which are in a joining region adjacent the abutting surface, serve to receive and center stripped waveguide ends 10. An etched-out recess 6 extends over the entire width of the centering grooves 4 at a point removed from the abutment surface forming the parting location 5. The recess 6 enables all of the light waveguides 10 with their protective layer or cladding 11 which may be a lacquer cladding to be received in this common space. After emplacement of the light waveguides, the centering grooves as well as the recess 6 of each carrier member 1 and 2 are covered by a cover plate 3 which has a recess 16 matched to the recess 6 and which is expediently glued to the carrier member or plate. The glue is introduced from the abutting surface of the carrier plate and the glue will penetrate into the inside as a consequence of capillary action in the centering groove 4 and due to the narrow gap between the cover plate 3 and the carrier plates 1 and 2, respectively. Thus, the glue entering in from the abutting surface will secure the carrier plate, cover plate and the light waveguides to one another in this fashion. The recesses 6 and 16 are subsequently expediently filled with an adhesive material. The connecting unit, which is formed by the plate 1 or 2 along with the waveguides such as optical fibers 10 and the cover plate 3, which unit is held together by the adhesive material, can have the surface which is to be the abutting surface ground and polished as necessary.

As illustrated in FIG. 1, the connector arrangement has, for example, twelve centering grooves 4, which are disposed side-by-side and proceed parallel to one another with a mutual spacing of 0.5 mm. The length of the centering grooves amounts to about 5 mm and it is noted that the portion of the groove 4 between the common recess 6 and the abutting edge are in a joining region.

To hold the two plates 1 and 2 with their cover plate in alignment, two auxiliary grooves 8 are etched in the same manner as the centering grooves adjacent each of the lateral edges of the carrier member 1 and 2, respectively. These auxiliary grooves 8 serve for alignment of the two carrier plates and receive guide elements 7 which have parallelly longitudinally extending ribs 9 which have the same profile as the grooves 8. As illustrated in FIG. 1, the guide elements 7 extend across the parting location 5 so that both carrier plates 1 and 2 and thus the centering grooves 4 of the two plates are aligned with each other. The overall arrangement, if it is a non-releasable connector arrangement, is then clamped and glued together. Resilient clamping elements, for example, come into consideration as holding means as does the housing which surrounds and fixes the overall arrangement. In such an arrangement, the two plates 1 and 2 could then be separated as desired. As illustrated, each of the auxiliary grooves 8 expediently has a trapezoidal cross-section which is matched to a trapezoidal cross-section for the ridge or profile 9 of the guide element 7. It is also noted that the grooves 8 in the plate are located at a distance from the centering grooves 4 in order to prevent the grooves 8 from becoming moistened by any adhesive. Thus, a very high precision for the overall connector arrangement is attainable due to a common etching of the grooves 4 and 8 into the plates 1 and 2.

The carrier plates 1 and 2, respectively, have dimensions of about $10 \times 17$ mm and a thickness of about 0.5 mm. A cover plate 3, which also consists of an etchable material such as, for example, silicon, are divided into two zones on their inside. The one zone rests flatly against the carrier plate 1 and presses the stripped light waveguides 10 into the centering grooves 4. The other zone has a recess 16 and covers the coated light waveguides 11. The dimensions of the cover plate amount to, for example, $9 \times 7$ mm and the thickness amounts to, for example, 0.5 mm in the region of the uncoated light waveguides and 0.3 mm in the region of the coated light waveguides.

Given a corresponding design of individual parts, it is also possible to dispose guide elements 7 only along one side of the centering grooves 4. In such an arrangement, a planar designed level adjustment is merely required at the second side to rest flat against the carrier plates 1 and 2. Further, the two carrier members 1 and 2 can be non-releasably connected together via the guide elements 7, if desired.

The light waveguides 10, which are fibers, have a cladding 11 removed over a specific length which is slightly longer than the length of the centering grooves 4. This removal must be undertaken so that the transition from the light waveguide without the protective layer to the light waveguide with the protective layer still lies within the region of the connecting system. A high mechanical stability of the light waveguide connection is therewith achieved. The light waveguide ends must be stripped over approximately equal lengths. A stripping tool employed for this purpose solves the problem in a simple manner by using chemicals. The light waveguides with the protective layer, such as a lacquer layer, are introduced into bores on a lid of a container which bores are only slightly larger than the diameter of the light waveguide with the protective layer. The lacquer protective layer will then swell under the influence of a chemical agent, for example, methyl chloride and will then be stripped off when the light waveguides are pulled from the bores. This stripping device is expediently designed for the acceptance of the entire plurality of waveguides being used in the connector and is disclosed in greater detail in my co-pending U.S. patent application Ser. No. 634,475, filed July 24, 1984. If desired, mechanical stripping can also be utilized.

After the stripping operation has been completed, the light waveguides for one of the carrier plates such as 1 with the cover 3 which form a plug part are inserted into two respectively spaced positioning combs, which are spaced apart a distance to enable receiving a carrier plate such as 1 or 2 therebetween. One of the two combs accepts the uncoated light waveguides 10 and has a spacing between the teeth of the comb which are formed by lamellae which are equal to the diameter of the waveguide with the spacing between the lamella and their width being selected so that the waveguides are at the spacing between the centering grooves 4. The second comb accepts the waveguides with the protective layer 11. To this end, the comb lamellae are arranged preferably by a graduated height and provided with different colors in accordance with the different colors of the light waveguides in order to facilitate the assembly operation. An interchangeable member for supporting the carrier member or plate 1 are matched to the position of the combs and include a positioning device The centering grooves 4 are thus fixed in alignment with the positioning combs by means of the positioning device. After the introduction of the light waveguides into the grooves 4, the cover plate 3 is applied and fixed with a separate auxiliary tool, for example, a clamping member of the interchangeable member. After this, the interchangeable member is now removed from this position together with the assembled and clamped parts forming the plug piece and while in this clamped condition the member is taken to the next work station in which electrical conctacts are engaged to energize a heating means in the member. The adhesive is now applied in a region of the end face and enters between the carrier plate and the cover plate due to capillary action to join the two parts to one another. This unit is now subject to curing in the heating means which is a part of the interchangeable plate or member. Expediently, the appliance has a plurality of positions for the interchangeable members so that a number of plug units can be processed simultaneously. The interchangeable members are thereby plugged into electrical contacts that are combined with heating elements. The plug parts which are still clamped together first are thereby heated so that the adhesive hardens in a short time. The arrangement can be provided with a light-emitting diode, for example, to indicate that the hardening process has been completed. Subsequent to the completion of the hardening process, the end face which forms the abutting surface can then be ground and polished. The above-mentioned device is more fully disclosed in my above-mentioned copending patent application Ser. No. 634,473.

The individual method steps are combined into a single device so that a handy assembly facility is easy to operate. The facility can be operated independently of whether it is connected to a power supply in a building or operating on batteries. Thus, it can be utilized for assembly when lying cables out in the field. The following structural elements for the consequentially correct sequence of the method for producing a connector arrangement according to the invention are thus combined by this device or facility. These include means for stripping the protective layer from the waveguides; a pair of combs for positioning the light waveguides in the correct position for introduction; and an interchangeable member or plate for the acceptance of the carrier plate, for preliminarily holding the carrier plate in alignment with the positioning comb and for holding a cover plate on the carrier plate after assembly of the waveguides in the centering groove until the next step of the method which is applying an adhesive or glue and hardening the adhesive glue to join the members together. The connector arrangement can be employed in monomode technology because of the high precision of the individual parts particularly of the centering and auxiliary grooves for mutual guidance.

Whereas the abutting surfaces as well as the light waveguides 10 must be ground and polished in the joint region 5 in the embodiment of FIG. 1, there is also a possibility for allowing this work step to be eliminated. This is particularly possible when well-functioning cutter means are employed for cutting the ends of the waveguides and produce sufficient planarity and flatness in the cut surfaces so that any additional grinding and polishing operations are not necessary. An advantageous embodiment of the carrier piece or plate is shown by a plate or carrier member 1a in FIG. 2. The fundamental structure of the plate 1a corresponds to the plate 1 of FIG. 1. The principal difference in the design of the plate 1a in comparison to plate 1 is that the plate 1a has a recess 5b provided adjacent the centering grooves 4a so that they terminate inward of the abutting surfaces 5a. It should be noted that a carrier plate 2a is shown in broken lines and has a similar structure to the plate 1a. Due to the recess 5b, the grooves 4a terminate a distance a from the abutting surfaces 5a. Thus, when the light waveguides are assembled in the grooves 4a, the end of each waveguide extends into the recess and is surrounded by air. Only the end face of the light waveguides thus abut directly in this region whereby additional grinding or polishing operations at the end faces are neither provided nor necessary. A precision coupling connection can be produced in this manner without great expense.

The assembly sequence essentially occurs in the following steps. A respective carrier member 1a is placed in an auxiliary tool which have the form of a mounting plate having a depression which is designed larger than the size of the carrier plate or can be placed on a surface which has a detent plate 12. As illustrated in FIG. 3, the plate 1a is assembled with the abutting surfaces 5a engaging the detent 12. Light waveguides 10a cut with the corresponding cutting means thus have adequately planar end faces and are inserted into the respective guide grooves 4a so that their end faces strike the detent plate 12 expediently with a certain mechanical longitudinal prestress. When all of the light waveguides 10a have been inserted into the guide grooves 4a in this fashion, the respective carrier member is covered with the appropriate cover plate similar to the plate 3 of FIG. 1, an adhesive is allowed to flow in from behind, i.e., in the region of the recess 6a.

In contrast to the embodiments according to FIG. 1, an adhesive is normally not supplied at the end face formed by the recess 5b in order to keep the joint of the light waveguides 10a from being moistened with adhesive. After the adhesive has hardened, the individual light waveguides are fixed in the position defined by the detent plate 12, namely, precisely in the future parting plane which is defined also by the abutting surfaces 5a. Thus, the end surfaces of the waveguides will yield a good connection with a low splice attenuation with light waveguides fixed to the carrier member 2a according to the arrangement illustrated in FIG. 2.

Since the end faces and thus the adhesive need not be ground and polished as would usually be the case, extraordinary high mechanical demands need not be made on the adhesive. For example, an adhesive which reacts to exposure of ultraviolet light and which hardens in a correspondingly short time is conceivable as the glue. The plates, for example, 3 or 3a', should thereby be designed as light transmissive. An optically faultless light waveguide connection can be produced by means of this embodiment given both a significantly low assembly time a well as a low apparatus cost. Thus, because of the presence of the recess 5b, the adhesive flowing in, for example, from behind the recess 6a, is certain to terminate at the end of the respective grooves 4a and cannot extend into and contact the end face of the light waveguides 10a. A disruptive influence of the glue on the quality of the splice connection is thus impossible.

The recess 5b has a width a which is expediently selected to be in the range of between 0.1 mm and 1 mm. A particularly practical value is 0.5 mm.

As has already been explained in conjunction with the connector of FIG. 1, the connection can occur rigidly with the carrier plates 1a and 2a being bonded to the particular cover plates 3 so that a rigid, closed structure will occur. However, it is also possible to create a releasable connector by means of corresponding clamping elements.

As in the embodiment according to FIG. 1, each of the carrier plates 1a and 2a are provided with auxiliary grooves 8a which coact with the guide members such as 7 to axially align the grooves 4a of the two plates 1a and 2a. As may be seen in FIG. 4, the cover plates 3a and 3a' can also be provided with a recess such as 5c and 5c', respectively. As illustrated, this recess is a depression in the region of the joint and therefore insures that the light waveguides 10a and 10a' extend into a space which is free in air, for example, free of adhesive. The recess 5b and 5b' of the carrier members 1a and 2a can be covered by a bottom plate, for exmaple, plate 13. A closed cavity is then formed by the recesses 5c,5c' and 5b,5b'. This cavity can then be filled with an immersion fluid if desired.

Instead of the recesses 5b and 5b' extending completely through the plates 1a and 2a, they can also have a shape similar to the recesses 5c and 5c', respectively. This recess will thus have the shape of the broken lines in FIG. 4 and the use of such a recess eliminates the need of closing the space by a plate 13 and thus reduces the cost of producing the connector.

Although various minor modifications may be suggested by those versed in the art, it should be understood that I wish to embody within the scope of the patent granted hereon, all such modifications as reasonably and properly come within the scope of my contribution to the art.

I claim:

1. In a connector for a plurality of light waveguides, said connector having two carrier plates, each plate having means for guiding the waveguides including V-shaped, parallel centering grooves etched into a surface of the plate, the improvements comprising each plate having an abutting surface extending transverse to the grooves and a joining region being formed adjacent said abutting surface, said grooves in the joining region having dimensions for receiving and positioning the waveguides free of any protective layer and cladding; a cover element for covering the grooves with the waveguides therein; two guide elements extending between the two plates and bridging the abutting surfaces to hold the plates with the grooves aligned; said cover element having a width less than the width of the carrier plate to provide two laterally spaced exposed portions on said plates; both of said laterally exposed portions having at least one auxiliary groove extending parallel to the centering grooves and the two guide elements having a ridge for engagement in the auxiliary groove; and means for holding the carrier plate, the cover element and the guide elements together.

2. In a connector according to claim 1, wherein the cover element is formed by two cover plates with one cover plate for each carrier plate.

3. In a connector according to claim 1, wherein a single cover element extends across both carrier plates.

4. In a connector according to claim 1, wherein each of the centering grooves adjacent an edge opposite the abutting surface are interconnected by a recess of a depth sufficient to enable accepting the light waveguides with their protective coating.

5. In a connector according to claim 4 wherein the cover element has a planar portion for engaging the joining region of the carrier plate having the centering grooves and an etched-out recess facing the recess in the carrier plate to facilitate receiving the protective layers of the waveguides.

6. In a connector according to claim 1, wherein each auxiliary groove has a trapezoidal cross-section and the ridge of the guide element has a corresponding cross-section.

7. In a connector according to claim 1, wherein a plurality of auxiliary grooves are disposed side-by-side and parallel to each other.

8. In a connector according to claim 1, wherein auxiliary grooves are provided along both sides of the centering groove.

9. In a connector according to claim 1, wherein each of the guide elements is releasably connected to the carrier plates to form a releasable connection therebetween.

10. In a connector according to claim 1, wherein the guide elements are secured in the auxiliary grooves of the two carrier plates to form a non-releasable connection therebetween.

11. In a connector according to claim 2, wherein the means for holding comprises a resilient clamp element.

12. In a connector according to claim 2, wherein the means for holding comprises an adhesive.

13. In a connector according to claim 2, wherein the means for holding comprises a housing receiving the element.

14. In a connector according to claim 2, wherein the means for holding includes an adhesive inserted at the abutting surface between the cover and the carrier plate to hold the cover and plate together with the waveguides in the centering grooves, said adhesive withstanding grinding and polishing.

15. In a connector according to claim 2, wherein the abutting surface is formed by grinding and polishing after assembling the cover on the waveguides and the centering groove.

16. In a connector according to claim 2, wherein each of the carrier plates are silicon.

17. In a connector according to claim 14, wherein the guide elements and cover plates consist of silicon.

18. In a connector according to claim 1, wherein each of the centering grooves adjacent an edge of the carrier plate opposite the abutting surface has an expanded size to enable receiving the waveguide with the protective layer.

19. In a connector according to claim 18, wherein the expanded size of the centering groove comprises a common recess.

20. In a connector according to claim 1, wherein at least a portion of the abutting surface is separated by a recess in the area of the centering groove so that the centering grooves terminate at a space from the plane of the abutting surface.

21. In a connector according to claim 20, wherein each of the light waveguides disposed in the grooves has an end freely extending in the region of the recess.

22. In a connector according to claim 20, wherein each recess has a depth in the range of 0.1 mm and 1 mm.

23. In a connector according to claim 22, wherein the recess has a depth of approximately 0.5 mm.

24. In a connector according to claim 23, wherein each of the carrier plates has a cover, each of said covers having a recess overlying the recess in the carrier plate.

25. In a connector according to claim 24, which includes providing an immersion fluid in the region of the overlying recesses.

26. In a connector according to claim 25, which includes means for closing the overlying recesses to form a cavity containing the immersion fluid.

27. In a connector according to claim 25, wherein each of the recesses of the carrier plate and cover does not extend through the entire thickness of the respective plate and cover.

28. A method for the production of a connector having a carrier plate with parallelly extending V-shaped grooves for receiving waveguides free of protective layers, said grooves extending into a common recess of a depth to receive the waveguide with the protective layer, each of the carrier plates having a cover for holding the waveguides in the centering groove and guide elements for holding a pair of plates with the grooves and waveguides of one plate aligned with the grooves and waveguides of the other plate as abutting surfaces are in contact with each other, said method comprising the steps of stripping the ends of the waveguides of the protective layer, holding the waveguides to extend parallel to each other with a spacing corresponding to the spacing of the centering grooves of the carrier plate; moving the carrier plate so that the centering grooves receive the stripped waveguide ends and the recess receives the waveguides with the protective layer and assembling the cover onto the carrier plate to hold the waveguides in the respective grooves.

29. A method according to claim 28, wherein the step of stripping includes utilizing chemical means for stripping the protective layer.

30. A method according to claim 28, wherein the stripping is accomplished by mechanical means.

31. A method according to claim 28, wherein subsequent to assembling the cover on the carrier plate the method includes moistening the waveguides with a adhesive.

32. A method according to claim 31, which includes curing the adhesive by applying heat.

33. A method according to claim 31, wherein the adhesive is actuated by ultraviolet light and the method includes curing the adhesive by applying ultraviolet light radiation to the assembled parts.

* * * * *